United States Patent
Kim

(10) Patent No.: US 6,748,213 B1
(45) Date of Patent: Jun. 8, 2004

(54) METHOD FOR AUTOMATICALLY CREATING HOME ZONE LIST IN A MOBILE TELECOMMUNICATION SYSTEM

(75) Inventor: Young-Hae Kim, Songnam-shi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 519 days.

(21) Appl. No.: 09/699,768

(22) Filed: Oct. 30, 2000

(30) Foreign Application Priority Data

Sep. 25, 2000 (KR) ........................................ 2000-56161

(51) Int. Cl.[7] .............................................. H04Q 7/20
(52) U.S. Cl. ................... 455/433; 455/432.3; 455/436; 455/456.5; 370/331
(58) Field of Search ................................ 455/432, 433, 455/436, 440, 456, 406, 432.1–432.3, 456.1–456.6, 434, 435.1; 370/310, 331, 328

(56) References Cited

U.S. PATENT DOCUMENTS

| | | | | |
|---|---|---|---|---|
| 5,946,621 A | * | 8/1999 | Chheda et al. | 455/440 |
| 5,999,522 A | * | 12/1999 | Rohani | 370/331 |
| 6,038,448 A | * | 3/2000 | Chheda et al. | 455/436 |
| 6,049,593 A | * | 4/2000 | Acampora | 379/56.2 |
| 6,272,122 B1 | * | 8/2001 | Wee | 370/342 |
| 6,360,098 B1 | * | 3/2002 | Ganesh et al. | 455/436 |
| 6,405,044 B1 | * | 6/2002 | Smith et al. | 455/447 |
| 6,442,389 B1 | * | 8/2002 | Marcum | 455/437 |
| 6,470,179 B1 | * | 10/2002 | Chow et al. | 455/406 |
| 6,490,450 B1 | * | 12/2002 | Batni et al. | 455/433 |

* cited by examiner

Primary Examiner—William Trost
Assistant Examiner—Stephen D'Agosta
(74) Attorney, Agent, or Firm—Cha & Reiter, L.L.C.

(57) ABSTRACT

A method for generating a new home zone list upon detecting the address information of a mobile user comprising the steps of receiving the address information of the mobile station; detecting target Base Transceiver Stations (BTSs) located within a predetermined distance around the mobile station. The coverage area, in which the address location is within, is divided into a plurality of sub-coverage areas. The detected BTSs are associated with each of the divided groups. The BTSs are prioritized within each of the divided groups into the first, second and third tier BTS. The new sector list is then generated for the mobile station based on the sector angle data of the first tier BTS.

13 Claims, 6 Drawing Sheets

FIG 2

| Subs DB: | HZ List | DB |
|---|---|---|
| msn | National Switching Number | |
| rid1 | Network Identifier (MSC) | |
| bts1 | (NH) BTS_ID | |
| sector1 | (NH) SECTOR_ID | |
| rtd1 | (NH) RTD_MIN | |
| offset1 | (NH) RTD_MAX | |
| | | |
| rid16 | Network Identifier (MSC) | |
| bts16 | (NH) BTS_ID | |
| sector16 | (NH) SECTOR_ID | |
| rtd16 | (NH) RTD_MIN | |
| offset16 | (NH) RTD_MAX | |

FIG 3

| DB Name | LDSPC | | | | Version | ED 1.0 |
|---|---|---|---|---|---|---|
| TABLE ID | bts_65 | | | | Date | YYYY.MM.DD |
| Dsc | | | | | | |

Table Description

BTS Parameter

| No | COLUMN | TYPE | Len | Feature | Storage Type | Description |
|---|---|---|---|---|---|---|
| 1 | bts_id | char | 16 | NOT NULL | | BTS ID |
| 2 | lati | char | 10 | NOT NULL | | Latitude |
| 3 | long | char | 11 | NOT NULL | | Longtude |
| 4 | angle1 | smallint | 2 | NOT NULL | | Angle of α sector(0-360) |
| 5 | angle2 | smallint | 2 | NOT NULL | | Angle of β sector(0-360) |
| 6 | angle3 | smallint | 2 | NOT NULL | | Angle of γ sector(0-360) |
| 7 | s_delay1 | smallfloat | 4 | NOT NULL | | Sector SystemDelay |
| 8 | s_delay2 | smallfloat | 4 | NOT NULL | | Sector SystemDelay |
| 9 | s_delay3 | smallfloat | 4 | NOT NULL | | Sector SystemDelay |
| 10 | svc_ran1 | smallfloat | 4 | NOT NULL | | Sector Service Range |
| 11 | svc_ran2 | smallfloat | 4 | NOT NULL | | Sector Service Range |
| 12 | svc_ran3 | smallfloat | 4 | NOT NULL | | Sector Service Range |
| 13 | exp_ran | smallfloat | 4 | | | Chip Number at Exception case |
| 14 | drty | smallint | 2 | | | BTS Add/Remove/Opt. |

Index Info

| No | INDEX Field | Description |
|---|---|---|
| 1 | bts65_idx(U) : bts_id | BTS_ID |

$$\theta = \arctan\left(\frac{y_b - y_h}{x_b - x_h}\right)$$

- Xb : BTS의 Long
- Yb : BTS의 Lat
- θ_antenna : 안테나 각도
- Xh : Subsb. Home Location (Long)
- Yn : Subsb. Home Location (Lati)

| | |
|---|---|
| Xh − Xb = 0, Yh − Yb > 0 | θ = 0° |
| Xh − Xb > 0, Yh − Yb > 0 | θ = (90 − θ)° * 180 / π |
| Xh − Xb > 0, Yh − Yb = 0 | θ = 90° |
| Xh − Xb > 0, Yh − Yb < 0 | θ = (90 − θ)° * 180 / π |
| Xh − Xb = 0, Yh − Yb < 0 | θ = 180° |
| Xh − Xb < 0, Yh − Yb < 0 | θ = (270 − θ)° * 180 / π |
| Xh − Xb < 0, Yh − Yb = 0 | θ = 270° |
| Xh − Xb < 0, Yh − Yb > 0 | θ = (270 − θ)° * 180 / π |
| Xh − Xb = 0, Yh − Yb = 0 | BTS angle = Home angle |

METHOD FOR AUTOMATICALLY CREATING HOME ZONE LIST IN A MOBILE TELECOMMUNICATION SYSTEM

CLAIM OF PRIORITY

This application makes reference to and claims all benefits accruing under 35 U.S.C. Section 119 from an application entitled "METHOD FOR AUTOMATICALLY CREATING HOME ZONE LIST IN A MOBILE TELECOMMUNICATION SYSTEM" filed in the Korean Industrial Property Office on Sep. 25, 2000 and there duly assigned Serial No. 99-56161.

BACKGROUND OF THE INVENTION

1. Field of the Invention

The present invention relates generally to mobile telecommunication systems. More particularly, the present invention relates to the provision of an updated home zone database for associated mobile subscribers.

2. Description of the Related Art

As the demand for wireless telephone services grows, many service providers are offering different service features to compete with other service providers. One feature offers charging fees for communication services at a lower rate when a subscriber makes a call connection from home. Such service allows the subscriber to designate on an individual basis the areas to be designated as Home to enjoy the service at a reduced rate. Accordingly, a telephone concept which is becoming popular is known as "One Number" service that allows a mobile subscriber to make a call connection using a single number.

In order to enable the mobile subscriber to utilize the mobile station for any calls, the concept of a "home zone" has been introduced. When the mobile subscriber makes a call connection within the home zone using the mobile station, the mobile subscriber is charged at a significantly lower time rate and not charged for the air time rate. Thus, within the home zone (i.e., the subscriber's home), the mobile subscriber can, using one communication terminal, originate outgoing calls and receive incoming calls without incurring expensive air time rate.

In conventional wireless networks, the home zone list used to classify telephone calls as home zone calls is updated by requiring the subscriber to perform some form of manual intervention. For example, a subscriber who moves from a mobile environment to designate a new home zone location informs the system of the change in the home zone by pressing certain keys (*65) on the mobile terminal in a similar fashion as a conventional call forwarding feature. When the code is dialed, the system determines the location of the subscriber at that time and updates this information into the database as the location of the home zone for billing purposes. However, this way of updating the home zone list is inconvenient for many users and can be triggered accidentally.

Accordingly, there is a need for a method to provide home zone service without requiring manual intervention by the mobile subscriber and to simplify the ways of designating the home zone.

SUMMARY OF THE INVENTION

It is, therefore, an object of the present invention to provide a method for generating a home zone list in a wireless communication system. The method includes the steps of receiving an address location where the subscriber wishes to define the home zone location; detecting target Base Transceiver Stations (BTSs) located within a predetermined distance around the address location; dividing the coverage area around the address location into a plurality of sub-coverage areas; associating the detected BTSs according to each of the divided groups; prioritizing the BTSs within each of the divided groups into a first, second and third tier BTS; and, generating the new sector list for the mobile subscriber based on the sector angle data of the first tier BTS.

According to another aspect of the invention, the new sector list is generated using the second and third tier BTS in the event that the data relating to the first tier BTS is missing.

In another aspect of the present invention, a system for defining a home zone for a subscriber within a wireless communication network comprises a means for forwarding an address location entered by the subscriber; a means for converting the address location into corresponding latitude and longitude coordinates; a means for determining a new sector list defining the home zone upon receiving the address location from the subscriber; and a means for storing the new sector list for the subscriber.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 2 is a table illustrating the subscriber's home zone list associated with a mobile station according to the embodiment of the present invention;

FIG. 3 is a table illustrating the parameter for all BTSs within a communication system according to the embodiment of the present invention;

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
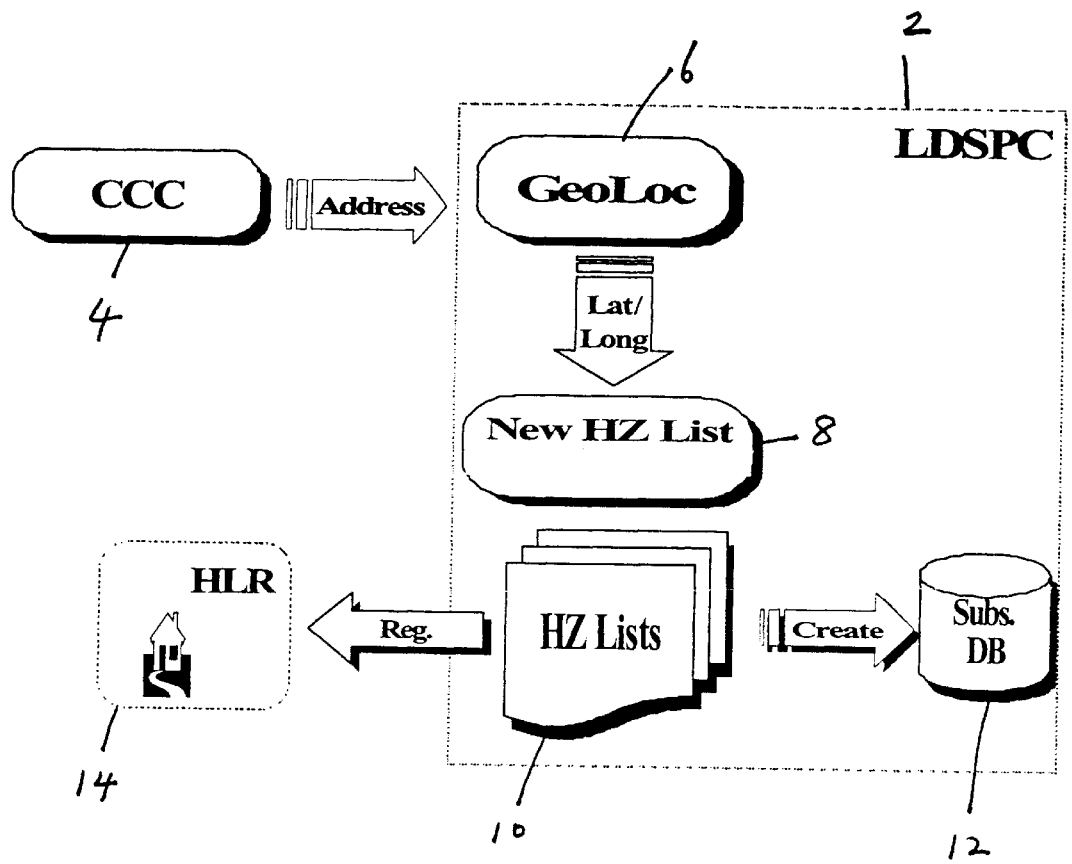
FIG. 1 is a block diagram illustrating the system according to the embodiment of the present invention.

Referring to FIG. 1, a preferred embodiment of the present invention is provided to generate a home zone list upon detecting a new mobile user or a user who has subscribed to the home zone service wishing to add or change the home zone within a wireless communication system. The process begins at a customer care center (CCC) 4 when the mobile subscriber wishing to designate a new home zone provides his or her home address to the CCC 4. The CCC 4 in turn forwards the home address information to a Location Determining & Service Provisioning Center (LDSPC) 2, which is a controller for coordinating and calculating the new home zone list based on the home address information from the subscriber and all of the BTS parameter information. After the new location for the home zone has been stored in the system, the billing function may be activated each time the subscriber initiates or receives a call. If the call is originated or received within the boundary of the home zone, a lower fee rate is charged to the user.

In generating the home zone assignment for the user who has subscribed to the home zone service, the method according to the present invention involves the user informing the CCC 4 of the physical address where he/she desires service (i.e., street address). The home zone is centered on the home address information provided by the subscriber. For example, the subscriber may enter the personal home street address or office address to benefit the home zone service. The operator at the CCC 4 then enters this information and forwards it to a Geographic Location element (GeoLoc) 6, where the address is stored in the database as the latitude and longitude coordinates for that particular home address location. Such information is readily obtainable from topographical maps which contains information relating street names and addresses with latitude and longitude coordinates. This information will be stored in a database for street addresses within the service area of the network. In the preferred embodiment of the present invention, more precise position information may be available using location information entered in degrees, minutes, and seconds.

Upon receiving the home address information from the CCC 4, the GeoLoc element 6 having the related location information for all BTSs in the system calculates a new home zone list 8 for the requesting subscriber. The new home zone information 10 calculated by the GeoLoc 4 (the algorithm used to calculate the new home zone list will be described later) is stored in a subscriber database 12. The mobile identity, time of location update, and other related home zone information are all maintained in that database. At the same time, the newly calculated home zone list is transmitted to the home location register (HLR) 14 for entry into the subscriber's profile record, reducing overall I/O requirements. Thereafter, the home zone information is typically queried on a per subscriber basis by applications requiring location data for the home zone service. That is, whenever the subscriber subsequently initiates or receives a call, a location operation is performed and compared to the parameter stored in the HLR database for billing purposes.

A detailed description of the algorithm used to generate the new home zone list is explained hereinafter with reference to FIG. 4 and in view of FIGS. 2 and 3, wherein FIG. 2 illustrates a newly calculated home zone list and FIG. 3 illustrates all information stored in the BTS parameter database.

Figure 4:
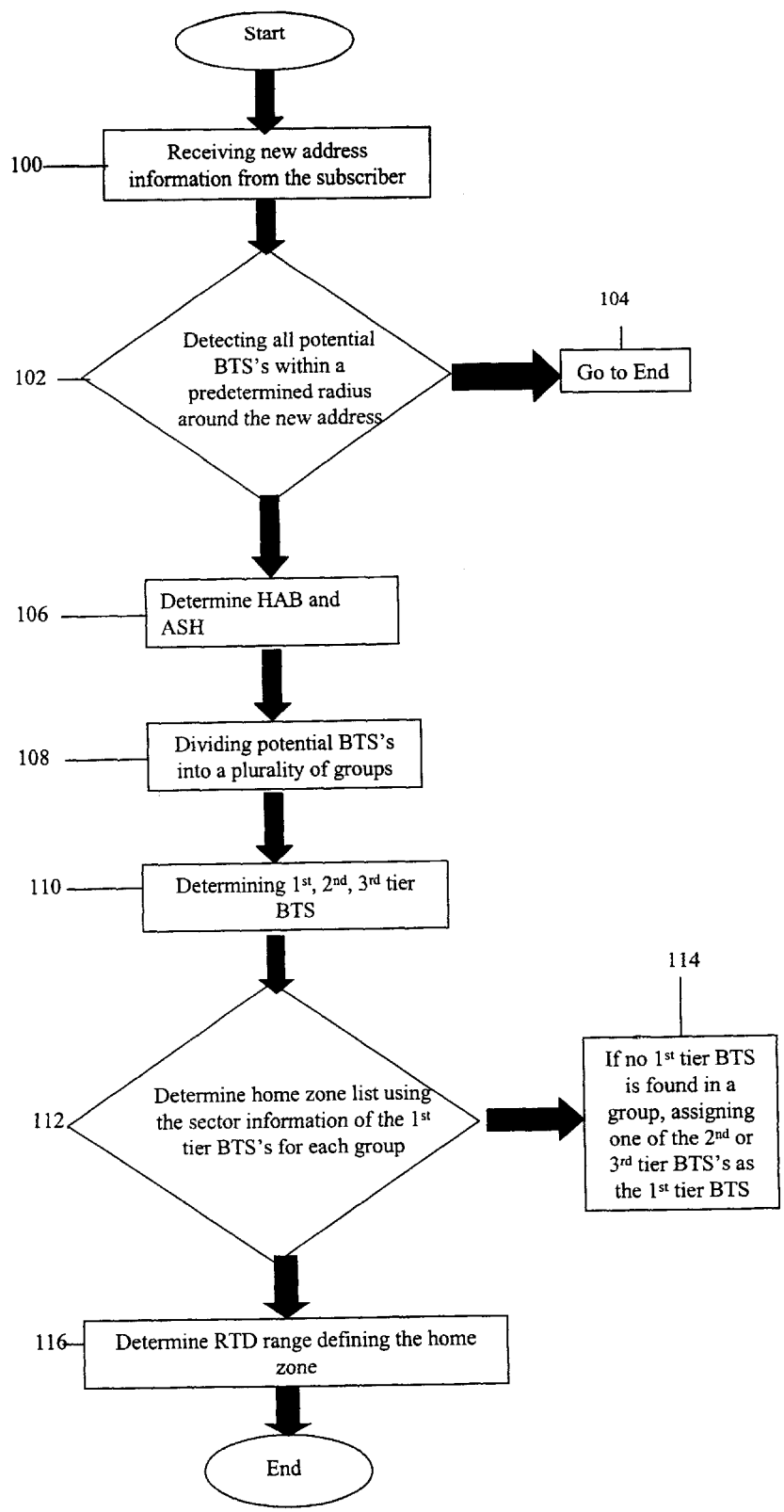
FIG. 4 is a flow chart illustrating the process of generating a new home zone list according to the embodiment of the present invention.

FIG. 4 illustrates the process of generating a new home zone list upon receiving the home address information from a subscriber via the CCC 4. Here, the requesting subscriber only has to provide physical address information where the subscriber wishes to define the new home zone to the CCC 4. In step 100, upon receiving the new address information, the GeoLoc element 6 retrieves the corresponding latitude/longitude location information for that particular subscriber, and accesses a database containing all BTS parameters in the system, as shown in FIG. 3. Alternatively, other suitable location techniques and associated information may be used to perform such location measurement. One example of a system which performs such location measurement would combine a standard global positioning system (GPS) receiver into the subscriber unit. Such combined GPS receiver and subscriber unit are known to those of ordinary skill in the art.

In step 102 of FIG. 4, the LDSPC compiles a list of potential target BTSs within a predefined radius D (i.e., 15 Km) around the location where the subscriber wishes to define the new home zone area using the corresponding latitude and longitude coordinates of the physical address information and the BTSs in the system. To obtain the target BTSs within a predefined radius (D), the following equation is used to determine a distance between the address location information and the respective BTS:

Equation (1):

$$D = [((x_{bts} - x_{home}) \times d_{long})^2 = ((y_{bts} - y_{home}) \times d_{lat})^2]^{1/2}$$

wherein $x_{bts}, y_{bts}$ represent the longitude/latitude (in the unit of second) of the BTS;

$x_{home}, y_{home}$ represents the longitude/latitude (in the unit of second) of the corresponding address information entered by the mobile subscriber; $d_{lat}$ represents the latitude distance in a particular geographical area in the unit of a second (i.e., 30.63 m); and, $d_{long}$ represents the longitude distance of a particular geographical area in the unit of a second (i.e., 25.95 m).

Figure 5:
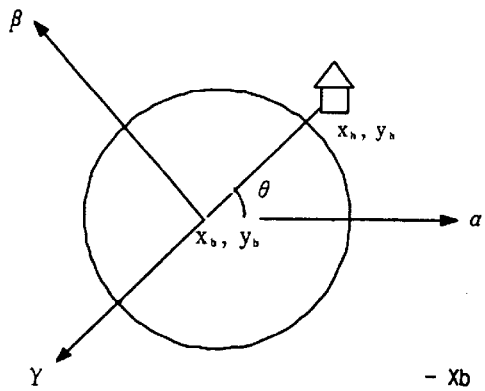
FIG. 5 is a method used to calculate an angle between the BTS and the subscriber address location.

In step 106 of FIG. 4, an angle HAB (angle between the subscriber's home address location relative to the BTS) is calculated. The calculation of the HAB is performed based on the latitude and longitude coordinates of the subscriber's home location and the BTS parameter database. The general equation for determining the HAB is illustrated in FIG. 5. For the purpose of clarity, calculation of the HAB is omitted as it is well known to those skilled in the art.

After determining the HAB for each BTS, the HAB is used to calculate the angle (ASH) between each sector of the BTS and the subscriber's home address location. The ASH value is calculated for each BTS that is located within a predetermined distance (D-TIER_ADJUST), for example 150 m, around the subscriber's home address location. Here, the reference distance 150 m is calculated in a fashion similar to the above equation (1).

For example, if the calculated HAB for a particular BTS is 50 degrees and the corresponding sector angles α, β, and γ of a particular BTS are 20, 150 and 290 degrees, respectively, then the corresponding ASH_α, ASH_β, and ASH_γ are calculated by subtracting the respective sector angles from the determined HAB of that particular BTS, as below;

ASH_α=|HAB−angle α|.

ASH_β=|HAB−angle β|.

ASH_γ=|HAB−angle γ|.

If [ASH_α, β, γ]=[HAB−angle α, β, γ]>180, then [ASH_α, β, γ]=(360−[HAB−angle α, β, γ]). If this condition exists, the sector antenna is pointing in the opposite direction away from the physical address location.

By applying the above equations,

ASH_α=|50−20|=30 degrees;

ASH_β=|50−150|=100 degrees; and

Figure 6:
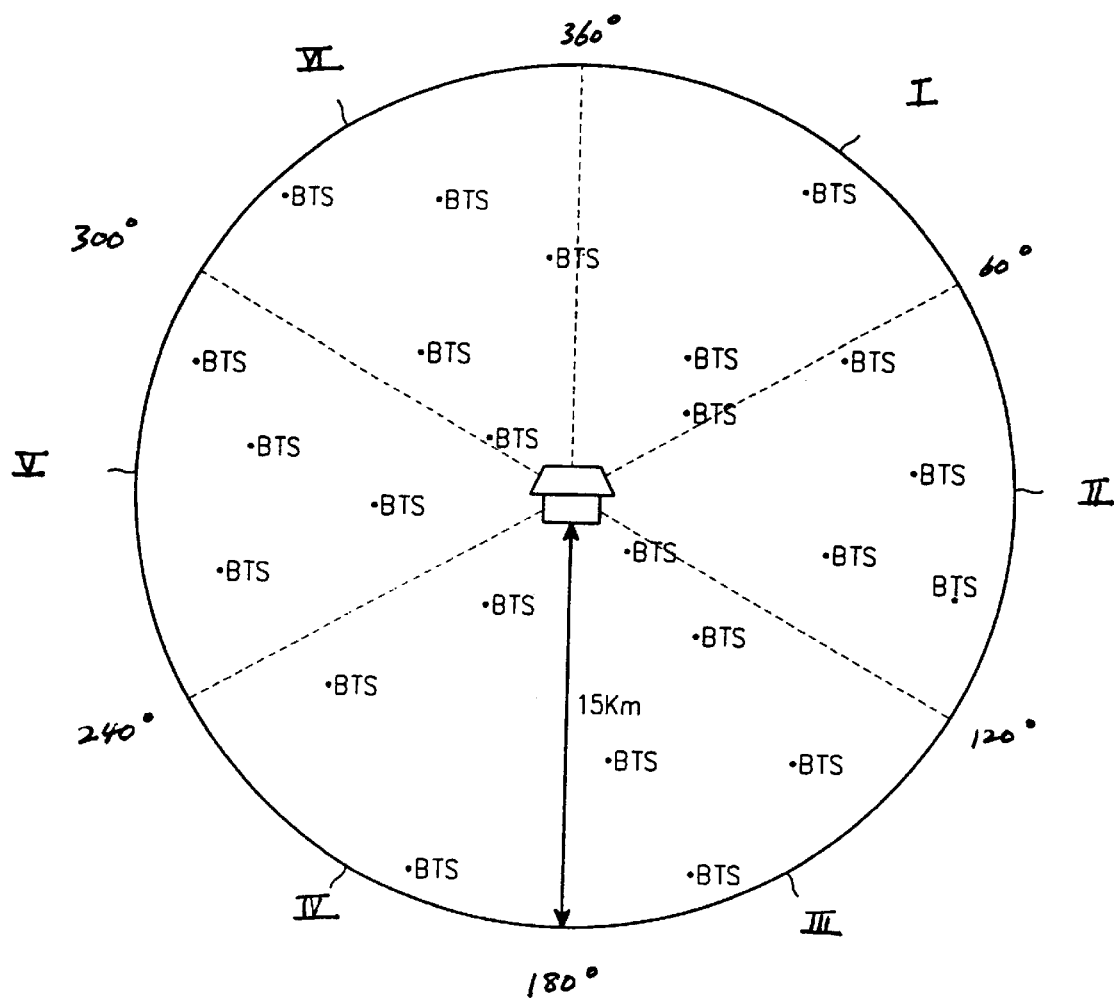
FIG. 6 is a diagram illustrating the coverage area of a subscriber address location when divided into a plurality of groups according to the embodiment of the present invention.

ASH_γ=|50−290|=240 degrees;

Thereafter, in step 108 of FIG. 4, the coverage area around the home address location is divided into a plurality of groups. According to the preferred embodiment of the present invention, six groups are divided around the home address location as shown FIG. 6. An range of 60 degrees is used to evenly divide the coverage area into six groups. As illustrated in FIG. 6, the first group (I) corresponds to the coverage area between 0 degrees to 59 degrees, the second group (II) corresponds to the coverage area between 60 degrees to 119 degrees, the third group (III) corresponds to the coverage area between 120 degrees to 179 degrees, the fourth group (IV) corresponds to the coverage area between 180 degrees to 239 degrees, the fifth group (V) corresponds to the coverage area between 240 degrees to 299 degrees, and the sixth group (VI) corresponds to the coverage area between 300 to 359 degrees.

After dividing the coverage area around the home address location into six groups and calculating the respective HAB and ASH, an association of the respective BTSs which fall within each of the divided groups is performed. All BTSs detected in step 102 are associated with the respective divided groups according to the calculated HAB. Thereafter, classification of the first, second and third tier BTS within each of the divided groups is performed. Preferably, each tier includes only one BTS.

With reference to the Table 1 and 2 below, the process of determining the first, second and third tier BTS will be explained hereinafter. Table 1 and 2 reflect the resulting data from the process performed in steps 106 and 108 of FIG. 4 for one of the divided groups.

TABLE 1

| | BTS Based Information | | | | |
|---|---|---|---|---|---|
| | BTS | DHB | ASH_$\alpha$ | ASH_$\beta$ | ASH_$\gamma$ |
| A | 1 | 12 | 100 | 60 | 210 | 310 |
| B | 2 | 16 | 150 | 50 | 250 | 350 |
| C | 3 | 4 | 200 | 80 | 230 | 330 |

TABLE 2

| | BTS Based Information | | | | |
|---|---|---|---|---|---|
| | BTS | DHB | ASH_$\alpha$ | ASH_$\beta$ | ASH_$\gamma$ |
| A | 1 | 12 | 100 | 60 | 210 | 310 |
| B | 2 | 16 | 150 | 250 | 150 | 50 |
| C | 3 | 22 | 250 | 80 | 260 | 350 |
| C | 3 | 74 | 800 | 90 | 230 | 350 |

The first tier BTS is determined according to the order of the DHB value and the ASH_[$\alpha$, $\beta$, $\gamma$]: the BTS having the lowest ASH value will be selected as the first tier BTS. Referring to Table 1, if the D-TIER_ADJUST is 150 m and if (DHB_A-DHB_B<150), (DHB_B-DHB_C<150) and (DHB_C-DHB_A<150), the BTS 16 will be selected as the first tier BTS because it contains the lowest ASH value (ASH_$\alpha$=50).

Referring to Table 2, if the D-TIER_ADJUST is 150 m and if (DHB_A-DHB_B<150), (DHB_B-DHB_C<150) and (DHB_C-DHB_A>150), the BTS 16 will be selected as the first tier BTS as it contains the lowest ASH value (ASH_$\gamma$=50) between the BTS 12 and the BTS 16.

The reason for selecting the BTS with the lowest ASH value to define the home zone is as follows. When directional antennas are employed at each cell site and sector site, the direction that an antenna faces is considered in the selection process of the first tier BTS, because the larger ASH value reflects the range that is outside the antenna's, "field of view". In most cases, the BTS with the smallest ASH value will have a high signal-to-noise value. Thus, it is desirable to exclude BTSs that do not face directly with the mobile unit from the home zone list defining the home zone. Thus, if the angle between the sector of the cell would be great enough, even if the signal-to-noise value between sectors were sufficient, the sector would be excluded from the BTS candidate sector list used to define the home zone.

Moreover, in the event that the DHB of all target BTSs within one of the groups exceeds the D-TIER_ADJUST of 150 m, as shown in Table 3, the BTS with the lowest ASH value will be selected as the first tier BTS within the group. Referring to Table 3 below, the BTS 16 is selected because the D-TIER_ADJUST>150 m and (DHB_A-DHB_B>150), (DHB_B-DHB_C>150) and (DHB_C-DHB_A>150).

TABLE 3

| | BTS Based Information | | | | |
|---|---|---|---|---|---|
| | BTS | DHB | ASH_$\alpha$ | ASH_$\beta$ | ASH_$\gamma$ |
| A | 1 | 12 | 1000 | 60 | 210 | 310 |
| B | 2 | 16 | 900 | 50 | 250 | 350 |
| C | 3 | 74 | 8000 | 80 | 230 | 330 |

After detecting the first tier BTS from each of the groups, the detected six first tier BTSs are prioritized according to the BTS with a lowest ASH value. Thereafter, the second and third tier BTSs is determined in a fashion similar to the calculation of the first tier BTS. First, a predetermined DHB value is selected for calculating the second and third tier BTS, respectively; then the detected target BTSs are sorted according to the order of the DHB value. Thereafter, the BTS with the lowest ASH value is selected as the second and third tier BTS in a fashion similar to the explanation shown in Tables 1, 2 and 3.

In step 110, after assigning the first, second and third tier BTS to each of the six groups, a service sector list containing the first tier BTSs for each of the divided six groups is determined in step 112. Here, the service sector list represents sector candidates that will be used later to define the home zone. As there are 6 first tier BTSs, one in each of the six groups, a maximum of six service sector data sets can be used to define the home zone. To narrow the service sector list, a reference value (D_BACKLOB_LIMIT), which represents the range of beam patterns having a lobe extending in a particular direction, is used to selectively eliminate the sector candidates that are not used for defining the home zone. Hence, based on the data collected in the multipath characteristic environment, the selection of an antenna beam pattern exhibiting an elongated lobe less than 976 m is best to facilitate communication with a distantly-positioned mobile unit. Accordingly, if the D_BACKLOB_LIMIT of the antenna corresponding to the sector angles $\alpha$, $\beta$, and $\gamma$ of the first tier BTS falls within the 976 m, then all sector angles $\alpha$, $\beta$, and $\gamma$ in that first tier BTS are included in the service sector list, which is later used to determine the boundary of the home zone service area. Moreover, if all of the sector angles $\alpha$, $\beta$, and $\gamma$ of the first tier BTS are less than a predetermined ASH_LIMIT (i.e., 105 degrees), then all of the sector angles $\alpha$, $\beta$, and $\gamma$ in the first tier BTS are included in the sector list. Furthermore, if an omni-directional antenna is implemented in the first tier BTS, all of the sector angles $\alpha$, $\beta$, and $\gamma$ of the first tier BTS are included in the sector list.

Similarly, the second and third tier BTS are treated in a fashion similar to the first tier BTS to determine the service sector list. The selection of the second and third tier BTSs is used for the following reason. In step 114, in the event that there is no target BTS detected within one of the divided six groups to determine the first tier BTS, one of the second and third tier BTSs from the adjacent groups with the lowest ASH value is selected as the first tier BTS in that missing group. For example, one of the ASH values from the second or third tier BTS that falls within ten degrees from the boundary of the missing group will be selected as the first tier BTS in the missing group. If no target BTSs are detected in the coverage area of Group II, one of the BTS with the lowest ASH value which falls between 50 degrees to 60 degrees from the Group I, or between 120 degrees to 130 degrees from the Group III, will be selected as the first tier BTS in the Group II. If, however, no BTS is found in the above range, the reference angle used to bring in the neighboring ASH value can be adjusted accordingly.

In step 116, once a complete service sector list is obtained for a particular subscriber, the corresponding RTD Range defining the boundary of the home zone service area is calculated according to the following equations (3):

$$CAL\_RTD=\{(DHB*2)/244.14+(SYSTEM\_DELAY*8)\}, \quad \text{Equations (3)}$$

wherein the SYSTEM_DELAY represents the respective sector system delay;

If $(CAL\_RTD<400)RTD\_MIN=CAL\_RTD*0.95$; and, $$RTD\_MAX=RTD\_MIN+120, \quad \text{Equation (3)(a)}$$

wherein the factors, 0.95 and 120, are arbitrary values set by the service vender in a given geographical location to obtain an optimal RTD range and thus may vary according to different service locations.

If $(CAL\_RTD>=400)RTD\_MIN=CAL\_RTD-20$; and $$RTD\_MAX=RTD\_MIN+120, \quad \text{Equation (3)(b)}$$

wherein the factors, 20 and 120, are arbitrary values set by the service vender in a given geographical location to obtain an optimal RTD range and thus may vary according to different service locations.

In the above equations, 1 chip=244.14 m and RTD (Round Trip Delay)=⅛ chip. The RTD values are expressed in bit periods, with each bit period corresponding approximately 244 meters between the MS and the BTS. The time required for a signal to travel from the home address location to a base station is indicative of the distance from the home zone to the base station.

The above process according to equation (3) is then repeated using the remaining sectors in the service sector list, thereby generating a new home zone list defined by the RTD ranges, shown in the below Table 4, for the requesting subscriber.

TABLE 4

|   | BTS | Sec | RTD min | RTD max | Remark |
|---|-----|-----|---------|---------|--------|
| 1 | 10  | 7   | 232     | 352     | α, β, γ |
| 2 | 18  | 0   | 232     | 352     | α      |
| 3 | 12  | 5   | 306     | 426     | α, β   |
| 4 | ... | ... | ...     | ...     | ...    |

As is apparent from the foregoing, the present invention has an advantage in that a home zone list, which provides support for the one number service or the home zone service, can be generated immediately upon the initiation of a call by a user who has subscribed the home zone service. The newly generated home zone list is automatically forwarded to the HLR and the subscriber database for the purpose of generating a billing record and optional subscriber rate message notification. Thus, the present invention simplifies data administration for the operator in that when the address information of the requesting mobile subscriber is received via the customer care center (CCC), the subscriber home zone information is stored for each subscriber in the database for each zone for each subscriber. Hence, when the subscriber initiates or receives a call, a location operation can be performed by comparing the parameter stored in the database for billing purposes.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for generating a new sector list to define a home zone for a subscriber within a wireless communication network, said method comprising the steps of:
   (a) receiving an address location information defining a personal home area from said subscriber;
   (b) detecting a plurality of target Base Transceiver Stations (BTSs) located within a predefined distance around said address location, each of said plurality BTSs having different sector angles;
   (c) dividing a coverage area around said address location into a plurality of sub-coverage areas;
   (d) associating said detected BTSs to each of said divided sub-coverage areas;
   (e) classifying said associated BTSs within each of said plurality areas into different tier BTSs; and
      (i) determining a home ankle (HAB) between said address location and said BTS;
      (ii) calculating, an angle (ASH) between each sector angle of said BTS and said address location by subtracting said respective sector angle of said BTS from said home angle (HAB); and
      (iii) classifying one of said plurality BTSs located within a first predetermined distance around said address location as said first tier BTS if said calculated angle (ASH) between said BTS sector angle and said address location has a lowest angle value; and,
   (f) generating said new sector list defining said home zone according to the sector angles of said first tier BTS.

2. The method of claim 1, further comprising the step of registering said determined new sector list to a home location register (HLR) associated with a mobile station of said subscriber.

3. The method of claim 2, further comprising the step of, upon initiating or receiving a call by a mobile station of said subscriber, comparing the location of said mobile station and the information stored in said HLR to generate different billing rate for said subscriber.

4. The method of claim 1, further comprising the step of storing geographic coordinates of said address location for said subscriber.

5. The method of claim 1, further comprising the step of converting said address location to the corresponding latitude and longitude coordinates.

6. The method of claim 1, wherein a distance between said address location and each of said target BTS is determined in accordance with the following equation to determine said target BTSs which fall within said predefined distance in said step (b):

$$D = [((x_{bts} - x_{home}) \times d_{long})^2 = ((y_{bts} - y_{home}) \times d_{lat})^2]^{1/2},$$

wherein $x_{bts}$ and $y_{bts}$ represent longitude and latitude distance of said BTS, $x_{home}$, and $y_{home}$ represent longitude and latitude distance of said address location, and $d_{lat}$, and $d_{long}$ represent 1 attitude and longitude coordinates of a particular geographical area.

7. The method of claim 1, wherein said plurality sub-coverage areas are evenly distributed around said address location.

8. The method of claim 1, wherein sub-step (iii) further comprises:
   (a) classifying one of said plurality BTSs located within a second predetermined distance from said first predetermined distance as said second tier BTS if said calculated angle (ASH) between said BTS sector angle and said address location has a lowest angle value, and
   (b) classifying one of said plurality BTSs located within a third predetermined distance from said second predetermined distance as said third tier BTS if said calculated angle (ASH) between said BTS sector angle and said address location has a lowest angle value.

9. The method of claim 1, wherein, if said BTS within one of said plurality sub-coverage areas is missing in said step (d), assigning one of said second and third tier BTSs from adjacent groups having a lowest sector angle value and which falls within a reference angle range as said first tier BTS for said missing sub-coverage area.

10. The method of claim 1, wherein said step (f) includes calculating corresponding RTD (Round Trip Delay) range defining the boundary of said home zone according to the sector angles of said first tier BTS.

11. The method of claim 10, wherein the calculation of said calculated RTD range is performed in accordance with the following equation:

$$CAL\_RTD = \{(DHB * 2)/244.14 + (SYSTEM\_DELAY * 8)\};$$

if $(CAL\_RTD < 400)$, $RTD\_MIN = CAL\_RTD * 0.95$; and $$RTD\_MAX = RTD\_MIN + 120;$$

if $(CAL\_RTD >= 400)$, $RTD\_MIN = CAL\_RTD - Z1$; and $$RTD\_MAX = RTD\_MIN + Z2,$$

wherein said RTD (Round Trip Delay) = 1/8 chip, 1 chip = 244.14 m, the SYSTEM DELAY represents the delay associated with the respective sector system, and the Z1 and Z2 represent an arbitrary value set by a service provider.

12. The method of claim 1, wherein said step (f) comprises includes:
   (i) eliminating a sector angle exceeding a threshold angle value from said first tier BTS, and
   (ii) eliminating a sector angle if a reference beam pattern of the antenna corresponding to the sector angle of said first tier BTS falls below a threshold value.

13. The method of claim 1, wherein said step (f) includes generating said new sector list using all the sector angles of said first tier BTS if an omni-directional antenna is used in said first tier BTS.

* * * * *